(12) United States Patent
Carney et al.

(10) Patent No.: US 11,149,894 B2
(45) Date of Patent: Oct. 19, 2021

(54) GAS VENTING

(71) Applicant: GE Oil & Gas UK Ltd, Bristol (GB)

(72) Inventors: Matthew Carney, Hartlepool (GB); Andrew Wharton, South Shields (GB); Michael Kelly, Consett (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 111 days.

(21) Appl. No.: 16/312,157

(22) PCT Filed: May 12, 2017

(86) PCT No.: PCT/GB2017/051321
§ 371 (c)(1),
(2) Date: Dec. 20, 2018

(87) PCT Pub. No.: WO2018/002571
PCT Pub. Date: Jan. 4, 2018

(65) Prior Publication Data
US 2019/0226614 A1      Jul. 25, 2019

(30) Foreign Application Priority Data
Jun. 29, 2016   (GB) ..................................... 1611246

(51) Int. Cl.
*F16L 55/07*      (2006.01)
*F16L 11/12*      (2006.01)
(Continued)

(52) U.S. Cl.
CPC ............... *F16L 55/07* (2013.01); *F16L 11/12* (2013.01); *F16L 11/22* (2013.01); *F16L 33/01* (2013.01);
(Continued)

(58) Field of Classification Search
CPC .......... F16L 55/07; F16L 11/083; F16L 11/12; F16L 11/22; F16L 33/01;
(Continued)

(56) References Cited

U.S. PATENT DOCUMENTS 1,487,539 A  *  3/1924  Clementz ................ F04B 53/00
                                                        137/512
1,624,572 A  *  4/1927  Bagby .................... A23C 3/031
                                                        137/627.5

(Continued)

FOREIGN PATENT DOCUMENTS

CN        102239355 A      11/2011
CN        103782079 A       5/2014
(Continued)

OTHER PUBLICATIONS

Office Action (including English translation) from the China National Intellectual Property Administration (CNIPA) for corresponding Chinese Application No. 201780040927.X, dated Mar. 27, 2020, 12 pages.

(Continued)

*Primary Examiner* — William M McCalister
(74) *Attorney, Agent, or Firm* — Klarquist Sparkman, LLP

(57) ABSTRACT

A vent arrangement for a flexible pipe body. The vent arrangement comprises a vent valve and an annular region flushing valve. The vent valve is arranged to couple to an annular region access port of a flexible pipe end fitting such that the vent valve can vent fluid from the pipe body annular region. The annular region flushing valve is in fluid communication with the vent valve and the annular region access port. The annular region flushing valve is arranged to inject fluid into the vent arrangement for flushing the vent valve, the annular region access port or the pipe body annular region. An end fitting incorporating the vent arrangement, a (Continued)

flexible pipe comprising the end fitting and a flexible pipe body coupled to the end fitting, and a method of manufacturing a flexible pipe are also disclosed.

9 Claims, 6 Drawing Sheets

(51) Int. Cl.
*F16L 11/22* (2006.01)
*F16L 33/01* (2006.01)
*F16L 11/08* (2006.01)

(52) U.S. Cl.
CPC ...... *F16L 11/083* (2013.01); *Y10T 137/87877* (2015.04)

(58) Field of Classification Search
CPC .................. Y10T 137/7839–7846; Y10T 137/87169–87241; Y10T 137/87877
USPC ........... 137/883, 625.4, 512–513, 596–596.2
See application file for complete search history.

(56) References Cited

U.S. PATENT DOCUMENTS

| | | | | | |
|---|---|---|---|---|---|
| 1,991,227 | A | * | 2/1935 | Proctor | F15B 13/02 137/596.12 |
| 4,534,173 | A | * | 8/1985 | Tsukamoto | F01N 3/22 60/606 |
| 4,570,677 | A | * | 2/1986 | Roxton | F16K 11/105 137/552 |
| 4,811,753 | A | * | 3/1989 | Bethune | F16K 24/04 137/216.2 |
| 5,042,537 | A | * | 8/1991 | Grantham | B67D 7/0488 141/59 |
| 5,232,023 | A | * | 8/1993 | Zimmerly | B67C 3/28 137/240 |
| 5,421,366 | A | * | 6/1995 | Naffziger | F01N 3/22 137/614.2 |
| 5,654,499 | A | * | 8/1997 | Manuli | F16L 11/12 138/104 |
| 6,039,083 | A | * | 3/2000 | Loper | F16L 33/01 138/135 |
| 6,119,454 | A | * | 9/2000 | Valisko | F02B 27/06 60/293 |
| 6,123,114 | A | * | 9/2000 | Seguin | F16L 11/083 138/124 |
| 2008/0149209 | A1 | * | 6/2008 | Felix-Henry | F16L 11/083 138/127 |
| 2011/0229271 | A1 | * | 9/2011 | Clements | E21B 43/01 405/224.2 |
| 2013/0005372 | A1 | * | 1/2013 | Strei | F28D 15/0275 455/500 |
| 2014/0013829 | A1 | | 1/2014 | Demanze et al. | |
| 2014/0124076 | A1 | * | 5/2014 | Roberts | F16L 33/01 138/109 |
| 2014/0260354 | A1 | * | 9/2014 | Lundberg | F25B 45/00 62/77 |
| 2014/0345739 | A1 | * | 11/2014 | Graham | F16L 11/18 138/120 |
| 2015/0203204 | A1 | * | 7/2015 | Burd | F16K 15/063 137/115.16 |
| 2015/0337769 | A1 | * | 11/2015 | Yoshioka | F02D 19/022 137/512 |
| 2016/0245445 | A1 | * | 8/2016 | Merchant | F16L 11/22 |
| 2017/0341149 | A1 | * | 11/2017 | Clements | B29C 64/153 |
| 2018/0128404 | A1 | * | 5/2018 | Gray | F16L 33/01 |
| 2018/0266607 | A1 | * | 9/2018 | Uenishi | F16L 37/32 |
| 2018/0283588 | A1 | * | 10/2018 | Gray | F16L 53/30 |
| 2018/0298705 | A1 | * | 10/2018 | Gudme | F16L 11/083 |

FOREIGN PATENT DOCUMENTS

| | | |
|---|---|---|
| WO | WO2008/076173 A2 | 6/2008 |
| WO | WO2010/067092 A1 | 6/2010 |
| WO | WO2011/026801 A1 | 3/2011 |
| WO | WO2012/092931 A1 | 7/2012 |
| WO | WO2013/005000 A2 | 1/2013 |
| WO | WO2016/092282 A1 | 6/2016 |

OTHER PUBLICATIONS

Search Report from the United Kingdom Intellectual Property Office for corresponding Application No. GB1611246.8, dated Dec. 19, 2016, 3 pages.

International Search Report and Written Opinion of the International Searching Authority, dated Aug. 16, 2017, for corresponding International Application No. PCT/GB2017/051321, 14 pages.

* cited by examiner

GAS VENTING

CROSS REFERENCE TO RELATED APPLICATIONS

This is the U.S. National Stage of International Application No. PCT/GB2017/051321, filed May 12, 2017, which in turn claims the benefit of and priority to United Kingdom Patent Application No. GB1611246.8, filed Jun. 29, 2016.

The present invention relates to gas venting. In particular, but not exclusively, the present invention relates to the venting of gas from a flexible pipe, including flexible pipe body and one or more end fittings, and also to the end fitting and the flexible pipe itself. The venting helps to prevent the build-up of gases that have permeated into the flexible pipe body from fluids such as oil or gas being transported, and helps to reduce the risk of collapse of the flexible pipe body. Certain embodiments of the present invention relate to a vent arrangement for venting the annulus of a flexible pipe that reduces the risk of vent blockage. Certain embodiments further provide for flushing a vent valve and the connection of the vent valve to the annulus.

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 metres (e.g., diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers. Some of these layers may be bonded to one another, for instance a composite pressure armour layer may be bonded, through physical or chemical means, to a polymer barrier layer. This bonding of these layers may be possible, for instance, as a result of the composite comprising material of sufficient similarity to that of the polymer barrier layer that it may readily be joined through for example the application of heat and pressure, or the materials may be sufficiently dissimilar to require an intermediate tie-in layer of a suitable material (see also application GB1402264.4).

In many known flexible pipe designs the pipe body includes one or more pressure armour layer. The primary load on such layers is formed from radial forces. If the pressure armour layers comprise one or more tape or wire, these often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wires forming hoop components, the radial forces from outer or inner pressure on the pipe cause the hoop components to expand or contract, putting a tensile load on the wires. Similarly these radial forces may be resisted by a continuous layer of composite material applied in known ways to the pipe in place of pressure armour wires or tapes.

In many known flexible pipe designs the pipe body includes one or more tensile armour layers. The primary loading on such a layer is tension. In high pressure applications, such as in deep and ultra-deep water environments, the tensile armour layer experiences high tension loads from a combination of the internal pressure end cap load and the self-supported weight of the flexible pipe. This can cause failure in the flexible pipe since such conditions are experienced over prolonged periods of time, particularly in dynamically loaded pipes, where fatigue damage can accumulate in the elements which make up the tensile armour layers (for example wires or tapes).

Unbonded flexible pipe has been used for deep water (less than 3,300 feet (1,005.84 metres)) and ultra-deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the layers of the flexible pipe body is increased. Flexible pipe may also be used for shallow water applications (for example less than around 500 metres depth) or even for shore (overland) applications.

Typically, metallic structural components such as pressure armour and tensile armour layers are sandwiched between inner and outer barrier layers (alternatively referred to as a liner and an outer sheath), for instance formed from a polymer that is impermeable to liquids. Between the inner and outer barrier layers is a pipe annulus within which is located the armour layers. While preferably the annulus is a sealed environment, it is possible that liquid may ingress the annulus due to damage to the flexible pipe body, and gas may also build up within the annulus. It is known to vent the annulus to militate against the risk of a dangerous build-up of pressure within the annulus, which in the extreme could result in a catastrophic failure of the flexible pipe body.

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting.

An end fitting may suitably be further configured to allow access to the pipe body annulus. This may include coupling a vent valve to the annulus to prevent pressure build-up. Generally, the flexible pipe and the end fitting include specific features, for instance a vent pathway, which allows gases that have built up in the annulus to be exhausted. A known problem is that if a vent valve or the coupling between the vent valve and the annulus becomes blocked then pressure can begin to mount within the annulus. It will be appreciated that due to mechanical motion of the flexible pipe, friction within the armour layers may lead to debris build up within the annulus as components bear against one another. Debris may also enter the annulus as a result of a breach of a barrier layer. It has been observed, during dissections of vent valves that have been in service, that vent valves coupled to the annulus of a flexible pipe may be partially or completely blocked due to debris originating within the annulus. Blocking is frequently experienced due to the small bore diameter of vent valves. A known mitigation is to provide more than one vent valve independently coupled to the annulus, though it will be appreciated that this increases the cost associated with annulus venting. Furthermore, space within and around the end fitting for providing multiple connecting pathways coupling to the annulus may be at a premium. Typically a maximum of three access ports are provided per end fitting for coupling vent valves to the pipe body annulus. It will be appreciated that if all three vent valves were to become blocked then the pipe body could no longer be used, if no option for replacing a vent valve is provided. Similarly, if a connecting tube between the pipe body annulus and a vent valve were to become blocked then there may be no alternative but to remove the vent valve and connect a hose for flushing the connecting tube and the annulus, which may not be practicable for sub-sea locations. Alternatively, if a vent valve is to be replaced this risks contaminants such as sea water entering the pipe body annulus.

It is an aim of the present invention to at least partly mitigate the above-mentioned problems.

It is an aim of embodiments of the present invention to provide an arrangement in which flexible pipe body is less likely to be subjected to excess pressure by gas build-up resulting from blocking of a venting arrangement.

According to a first aspect of the present invention there is provided a vent arrangement for a flexible pipe body, the vent arrangement comprising: a vent valve arranged to couple to an annular region access port of a flexible pipe end fitting such that the vent valve can vent fluid from the pipe body annular region; and an annular region flushing valve in fluid communication with the vent valve and the annular region access port, the annular region flushing valve being arranged to inject fluid into the vent arrangement for flushing the vent valve, the annular region access port or the pipe body annular region.

The vent arrangement may comprise at least two vent valves coupled together to be in fluid communication with one another and arranged to couple to the annular region access port such that each vent valve may vent fluid from the pipe body annular region.

The vent valve may be arranged to couple to at least two annular region access ports of the flexible pipe end fitting such that each vent valve may vent fluid from the pipe body annulus via any coupled annular region access port.

The vent arrangement may further comprise a connecting harness arranged to cross couple the at least two vent valves to at least the at least two annular region access ports of a flexible pipe end fitting.

The vent arrangement may further comprise a manifold interconnecting each vent valves and annulus flushing valve.

The vent arrangement may further comprise at least one isolation valve coupled to a respective vent valve and arranged to selectively isolate the vent valve or annular region flushing valve from fluid communication with the remainder of the vent arrangement.

According to a second aspect of the present invention there is provided an end fitting for a flexible pipe body, the end fitting comprising: a body arranged to couple to a first flexible pipe body, the body having a bore arranged to be in fluid communication with the bore of the first flexible pipe body and the body being arranged to couple to a second flexible pipe body, a further end fitting or flexible pipe terminal equipment; at least one annular region access port formed within or connected to the body and arranged to allow fluid communication with an annular region of the first flexible pipe body; and a vent arrangement according to any one of the preceding claims.

The vent arrangement may be coupled to or at least partially incorporated into the body of the end fitting.

According to a third aspect of the present invention there is provided a flexible pipe comprising an end fitting as described above and a flexible pipe body coupled to the end fitting.

According to a fourth aspect of the present invention there is provided a method of manufacturing a flexible pipe, the method comprising: coupling an end fitting for a flexible pipe to a flexible pipe body; wherein the end fitting comprises: a body arranged to couple to a first flexible pipe body, the body having a bore arranged to be in fluid communication with the bore of the first flexible pipe body and the body being arranged to couple to a second flexible pipe body, a further end fitting or flexible pipe terminal equipment; at least one annular region access port formed within or connected to the body and arranged to allow fluid communication with an annular region of the first flexible pipe body; and a vent arrangement comprising: a vent valve arranged to couple to the annular region access port such that each vent valve can vent fluid from the pipe body annular region; and an annular region flushing valve in fluid communication with the vent valve and the annular region access port, the annular region flushing valve being arranged to inject fluid into the vent arrangement for flushing the vent valve, the annular region access port or the pipe body annular region.

Certain embodiments of the invention provide the advantage that the risk of a venting arrangement being blocked is reduced. Certain embodiments of the present invention provide a methodology and apparatus for reducing the development of pressure in annular regions of a flexible pipe by allowing gas to be vented from the annular regions of a flexible pipe body.

Embodiments of the invention are further described hereinafter with reference to the accompanying drawings, in which.

In the drawings like reference numerals refer to like parts.

Figure 1:
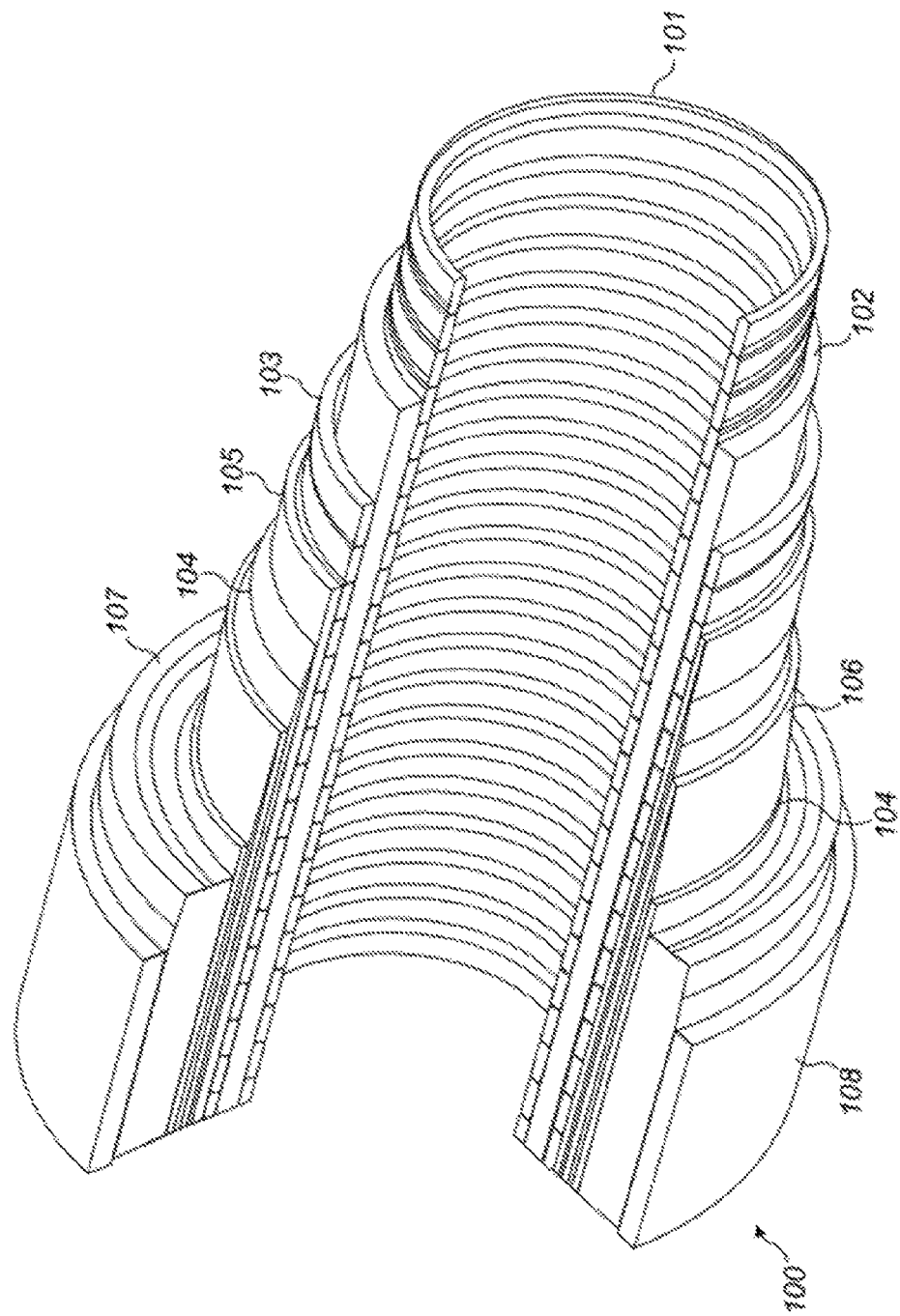
FIG. 1 illustrates the constructions of a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres or wires.

As illustrated in FIG. 1, a pipe body 100 includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs to balance twist or torque in the pipe when these layers are put under tension. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

For the flexible pipe body 100 shown in FIG. 1, the pipe body annulus extends between the internal pressure sheath 102 and the outer sheath 108.

Each flexible pipe comprises at least one portion, sometimes referred to as a segment or section of pipe body 100 together with an end fitting located at one end or both ends of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
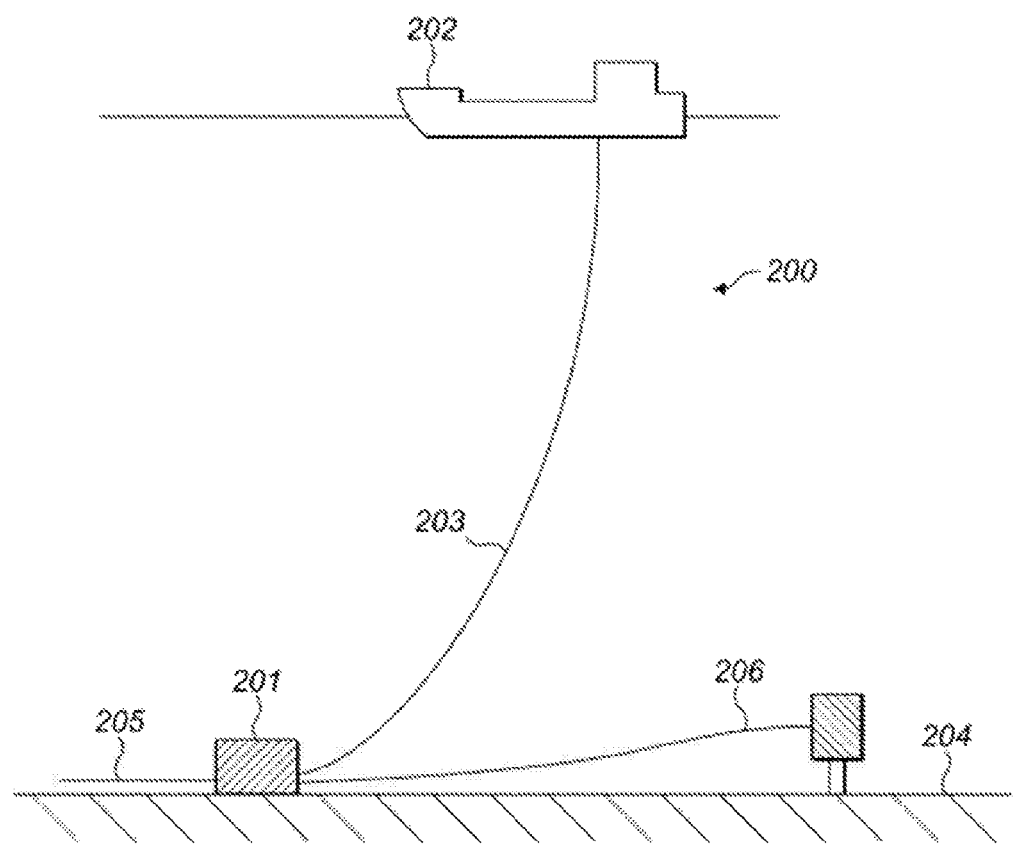
FIG. 2 illustrates a riser assembly suitable for transporting production fluid such as oil and/or gas and/or water from a sub-sea location to a floating facility.

FIG. 2 illustrates a riser assembly 200 suitable for transporting production fluid such as oil and/or gas and/or water from a sub-sea location 201 to a floating facility. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship 200. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
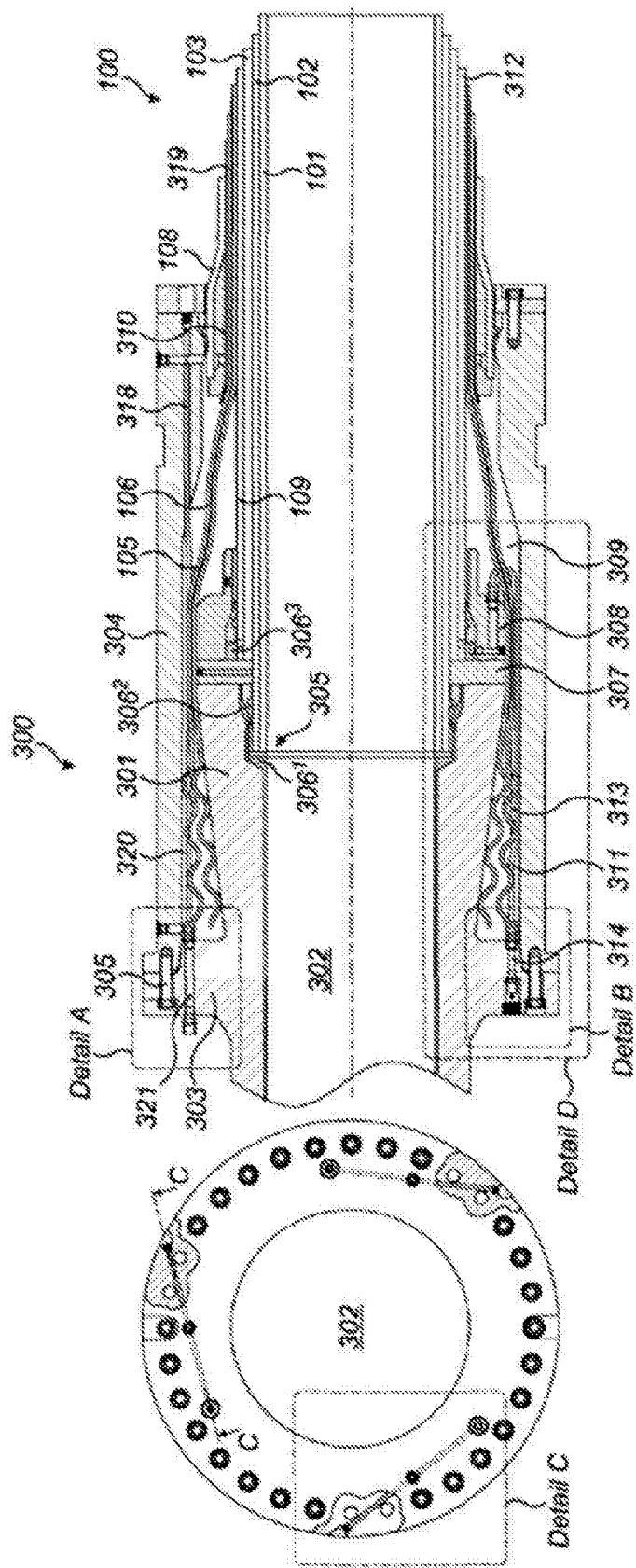
FIG. 3 illustrates an end fitting of a flexible pipe.

FIG. 3 illustrates how an end of a segment of flexible pipe body 100 may be terminated in an end fitting 300. While one particular form of end fitting 300 is described in detail in order to illustrate how conventionally a venting arrangement serves to exhaust gases from a pipe body annular region, it will be understood that the present invention is not limited to the particular form of end fitting shown here, especially in relation to matters separate to gas venting.

The end fitting 300 includes a generally annular body 301, which has an axially extending inner bore 302. The end fitting body is made from steel or other such rigid material. The inner bore 302 has a diameter that preferably matches a corresponding inner diameter of the segment of flexible pipe body to be terminated in the end fitting 300. In use, production fluid can flow smoothly through the inner bore of the flexible pipe body and the inner bore 302 of the end fitting. The end fitting body 301 at a first end thereof defines an open mouth region in which a suitably cut end of flexible pipe body may be introduced during a termination process. A flange region 303 extends outwardly from the end fitting body 301 and is located near a remaining end region of the end fitting body. The flange region forms a connector for connecting the end fitting to a matching connector of a further end fitting of an adjacent segment of flexible pipe, or to a floating or stationery structure or vessel for example. An end fitting jacket 304 is secured to the flange region 303 by a suitable securing mechanism such as one or more bolts 305. The jacket 304 houses various components of the end fitting and helps to protect them.

The flexible pipe body 100 is a multi-layered structure, for example as per FIG. 1, comprising at least a carcass layer 101, barrier layer 102 and outer sheath 108. In this embodiment the flexible pipe body also includes a seal layer 109 of polymer provided around a pressure armour layer 103. The various layers of flexible pipe body are cut at desired lengths prior to termination in the end fitting 300.

The flexible pipe body is brought together with the open mouth region of the end fitting body 301. The open mouth region has a stepped region 305 to receive a sealing ring $306^1$, and then the carcass layer 101 and barrier layer 102. The sealing ring $306^1$ helps to seal the ends of the carcass layer and barrier layer.

A further sealing element $306^2$ is located in a generally tapered recess formed between an inner surface of the open mouth region and a radially outer surface of the barrier layer 102. The sealing element $306^2$ is generally annular with a tapered edge to conform to the end fitting body, and may be of polymer or metal or a mixture thereof, for example.

An inner collar 307 is secured to an end of the open mouth region of the end fitting. During the termination process the securing of the inner collar 307 to the end fitting 300 will drive the sealing ring $306^2$ into the tapered recess to provide a good seal. The inner collar 307 may be formed from steel and may be substantially ring-like in shape. Further O-ring seals may be provided to help provide a seal for preventing a leak path between the inner collar 307 and the end fitting, and the inner collar and an outer collar 308.

The outer collar 308 may be a Flexlok™ collar available from GE Oil & Gas UK Ltd. The outer collar is provided radially outwards of a seal layer 109 and is secured to the end fitting by one or more bolts, for example, via the inner collar 307. A yet further sealing element $306^3$ is located in a tapered recess between an inner surface of the outer collar 308 and a radially outer surface of the seal layer 109. The seal ring $306^3$ may be a Flexlok™ Ring available from GE Oil & Gas UK Ltd, for example.

Further layers of the flexible pipe body that lie radially outside the seal layer 109 are terminated at desired lengths within a cavity 309 defined between an inner surface of the jacket 304, the end fitting body 301 and the seal layer 109. The cavity 309 may be filled with a resin material to help secure layers of flexible pipe body to the end fitting. An outer sheath 108 is secured between a collar 310 and the end fitting jacket 304.

It will be appreciated that the barrier layer 102 and the seal layer 109, which is coaxial with the barrier layer 102, form between them an elongate pipe body annular region. This annular region contains the pressure armour layer 103, but could include further layers such as armour wires and tape layers depending on the flexible pipe body design.

Similarly, the seal layer 109 and outer sheath 108, which is coaxial with the seal layer 109, form between them a further elongate annular region. This further annular region may contain the tensile armour layers. Again, this annular region could contain other layers such as armour wires and tape layers depending on the flexible pipe body design. It will be appreciated though that alternative flexible pipe body designs, not illustrated, may including only a single annular region or three or more annular regions. The present invention is not limited to any particular arrangement of annular region, only that there is at least one within which gases may build-up and may be vented. Venting for the particular flexible pipe body and end fitting of FIG. 3 will now be described.

As mentioned above, when production fluid such as gas or liquids containing gas are transported through a flexible pipe, over time gas can permeate through the fluid retaining layer (barrier layer) and accumulate in one or more pipe body annular region. With two annular regions, gas could firstly accumulate in the inner annular region, before pressure builds and the gas migrates though the seal layer to the outer annular region. Any build-up of pressure in an annular region is detrimental to the construction of the flexible pipe body and could decrease lifetime or cause complete failure of the flexible pipe.

Figure 7:
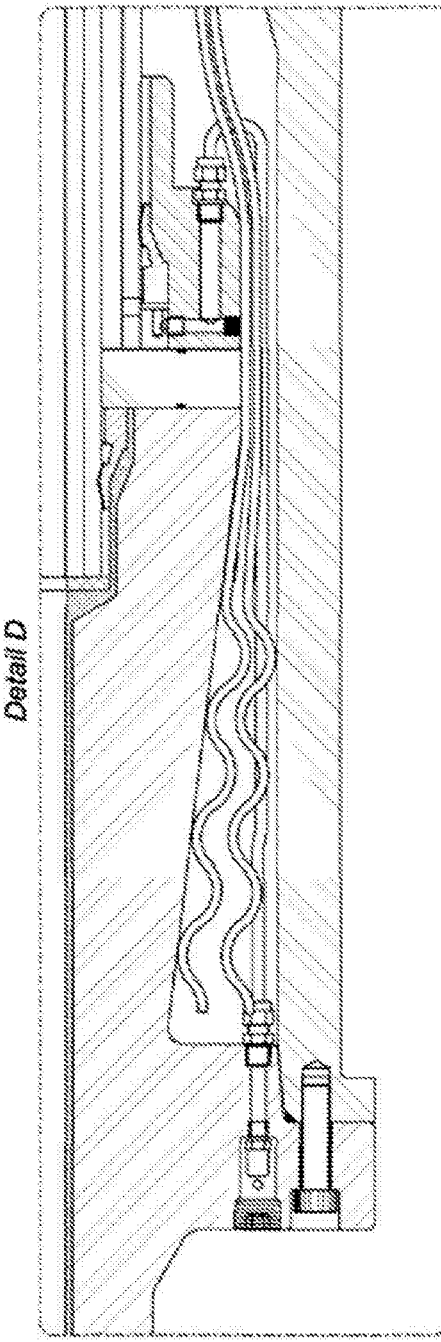
FIG. 7 illustrates an enlarged portion of part of FIG. 3.

In the present end fitting 300, a vent flow fluid communication path (or "vent path") 311 for venting an inner annular region 312 of the flexible pipe body is formed through the end fitting 300 between the inner annular region 312 and an outer surface of the end fitting 300. A passageway runs through the inner collar 307 and a further passageway runs through the outer collar 308. These passageways are formed to link the inner annular region 312 with a tubular conduit 313 provided in the cavity 309. The tubular conduit 313 extends from the connection with the passageway in the outer collar to a connection with a further passageway 314 in the flange region 303 of the end fitting. An enlarged view of the vent path in the section identified as DETAIL D is shown in FIG. 7.

Figure 5:
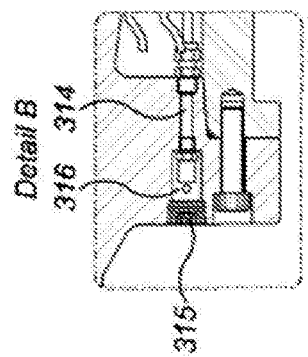
FIG. 5 illustrates an enlarged portion of part of FIG. 3.

The passageway 314 runs from the connection with the tubular conduit 313 in a direction parallel to the pipe's longitudinal axis. It may then turn 90° towards an exit point on the side of the end fitting, though it will be appreciated that the orientation of the exit point may vary. An enlarged view of the vent path 311 in the section identified as DETAIL B is shown in FIG. 5. The vent path 311 additionally includes a valve 315 (referred to herein as a vent valve) located in a recess 316 in the end fitting. The term "vent valve" is to be interpreted broadly to encompass any valve arrangement capable of admitting gas or liquid from the pipe body annulus. The valve 315 is a non-return valve of a mechanical type that opens when a small pressure difference is created across the vent valve. This pressure difference may be set at around 2 bar. Accumulated gas may vent by virtue of an internal pressure being higher than a pressure downstream of the vent valve (i.e. after the vent valve in terms of gas being exhausted from the annulus region to an exit point). The non-return valve 315 provided in the vent path helps prevent or inhibit gas from returning to the inner annulus region from the end fitting.

Figure 6:
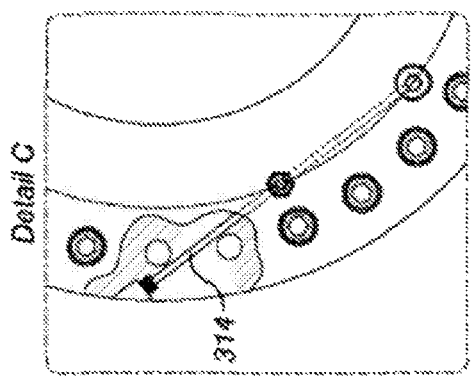
FIG. 6 illustrates an enlarged portion of part of FIG. 3.

The drawing on the left hand side of FIG. 3 shows a view of the end fitting 300 in a section orthogonal to the view shown on the right hand side of FIG. 3. An enlarged view of the vent path in the section identified as DETAIL C is shown in FIG. 6. As can be seen from the drawing on the left hand side of FIG. 3, the end fitting of FIG. 3 actually includes three separate vent paths and hence vent valves 315 fluidly connected to the inner annular region of the flexible pipe body. The provision of three vent paths is for redundancy and helps to maintain the function of gas venting should there be a blockage, for example. However, according to various embodiments of the present invention a single vent path, specifically a single vent valve, or any number of vent valves could equally be used.

Referring again to FIG. 3, a further vent flow fluid communication path (or "vent path") 318 for venting an outer annulus region 319 of the flexible pipe body is formed through the end fitting 300 between the outer annulus region 319 and an outer surface of the end fitting 300. As noted above, for other pipe body structures there may only be a single annular region and hence no need to provide a second or further vent path. A passageway runs through the end fitting jacket 304 from an end region of the jacket furthest from the flange region. The passageway runs radially outwards from the bore region and then turns 90° to run parallel to the pipe's longitudinal axis. As can be seen in FIG. 3, this passageway is actually formed by two passageways provided at 90° that interconnect at a junction, with the redundant sections of the passageways being blocked by plug members, or the like. Part way along the jacket 304, the passageway emerges from the jacket and is connected to a tubular conduit 320 located in the cavity 309. The tubular conduit extends from the connection with the passageway in the jacket to a connection with a further passageway 321 in the flange region 303 of the end fitting. These passageways 318, 320, 321 link the outer annulus region 319 with an exterior region of the end fitting 300. Exhaust gas may migrate from the outer annulus region 319 through the cavity 309 to the passageways. The cavity 309 may be filled with a resin, in which case a venting conduit could be placed in the cavity prior to filling with resin, such that the conduit could fluidly connect the outer annulus region with the passageways.

Figure 4:
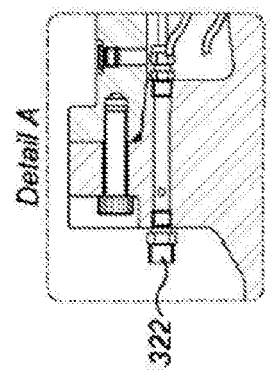
FIG. 4 illustrates an enlarged portion of part of FIG. 3.

An enlarged view of the vent path 318 in the section identified as DETAIL A is shown in FIG. 4. The vent path 318 additionally includes a valve 322 (a further vent valve) located at an exit port 323 of the end fitting. The valve 322 is a non-return valve of a mechanical type that opens when a small pressure difference is created across the vent valve. This pressure difference may be set at around 2 bar. Accumulated gas may vent by virtue of an internal pressure being higher than a pressure downstream of the vent valve. The non-return valve 322 provided in the vent path helps prevent or inhibit gas from returning to the outer annulus region from the end fitting.

During operation, accumulated gas in each annular region of the flexible pipe may be exhausted to a flare system above sea level, for example, via exhaust pathways external to the end fitting (and not illustrated) which couple to the respective vent valves. A first pathway is provided by the inner annulus region 312, pathways in the inner collar 307 and outer collar 308, the tubular conduit 313 and the passageway 314. The passageway 314 may be connected to a tubular conduit to take the exhausted gas to a flare system or other suitable exit point or collection point. A second pathway is provided by the outer annulus region 319, the pathway in the jacket 304, the tubular conduit 320 and the passageway 321. Again, the passageway 321 may be connected to a tubular conduit to take the exhausted gas to a flare system or other suitable exit point or collection point.

The apparatus may be arranged such that gas is completely prevented from mixing between the annular regions, with each annulus being provided with a separate vent path to exhaust any accumulating gas. Each vent path also has a non-return vent valve to help prevent gas from returning to the respective annulus region. However, each or one of the vent paths could alternatively be provided without a non-return valve.

FIGS. 3 to 7 illustrate each vent valve 315 and 322 being fully or partially embedded into the body of the end fitting 300, for instance being inserted into a cavity drilled into the end fitting body or flange. A vent valve may be recessed or flush with the surface of the end fitting. It will be appreciated that this is not essential to the present invention, though may be an arrangement that is desirable in practice, due to the reduced risk of damage to vent valves. In certain embodiments at least one vent valve may be provided external to the end fitting.

According to certain embodiments the vent valve may be arranged to only vent gas from the pipe body annulus for situations in which the pipe body annulus is purposefully filled with a fluid, for instance demineralised water including a corrosion inhibitor. The term "vent plug" may be used interchangeably for "vent valve". As described above, each vent valve may be coupled to a pipe body annulus via a vent path within the end fitting.

Figure 8:
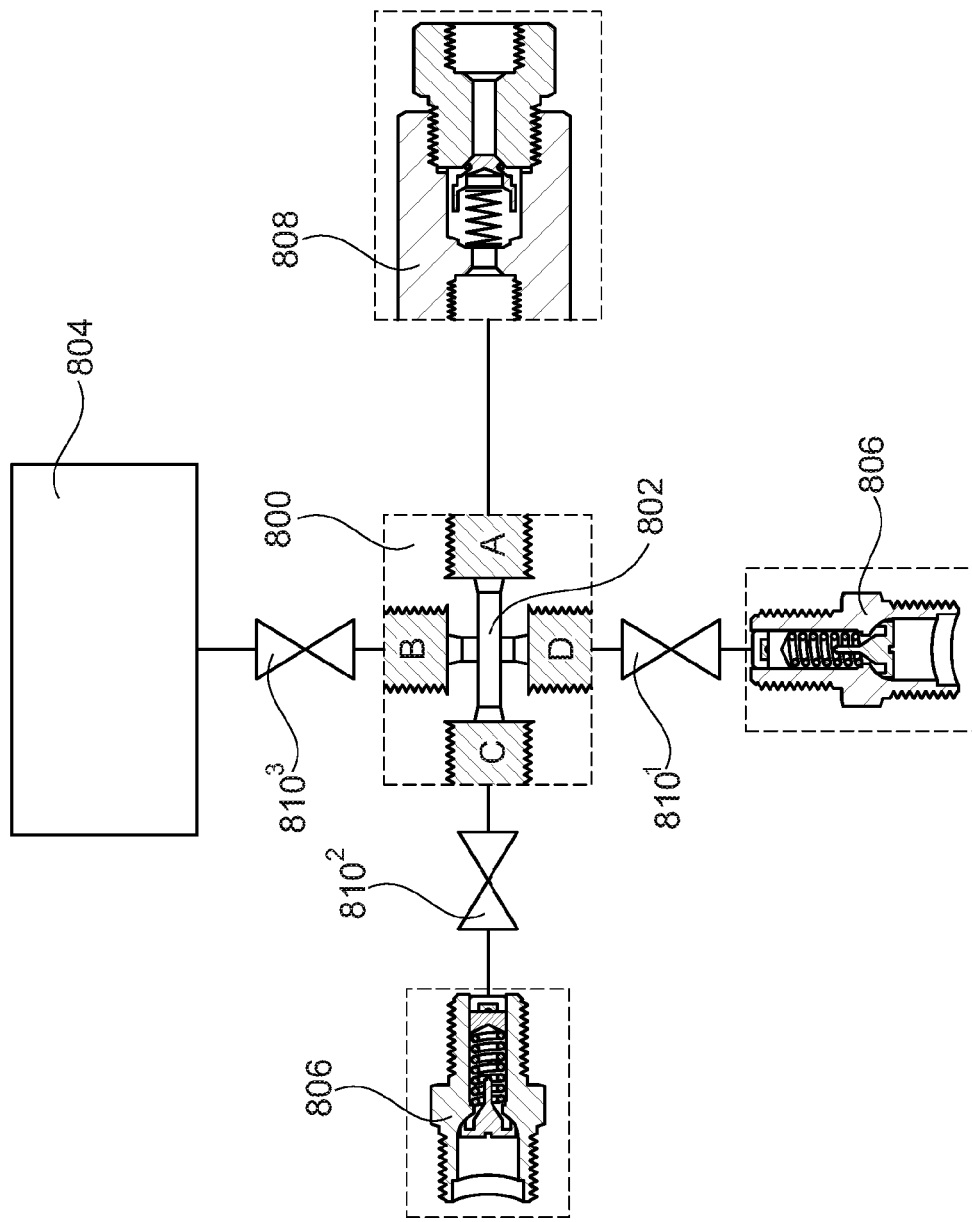
FIG. 8 illustrates a vent arrangement for a flexible pipe body according to an embodiment of the present invention.

Referring now to FIG. 8, in accordance with an embodiment of the present invention a venting arrangement comprises a manifold 800 in fluid communication with an annular region of a flexible pipe body. Specifically, the manifold 800 is in fluid communication with an annular region access port 804 upon or within an end fitting such that the manifold is in fluid communication with a pipe body annular region (not illustrated in FIG. 8). The annular region access port 804 may comprise a passageway, lumen or tube within an end fitting extending to or in fluid communication with a flexible pipe body annular region. Where the venting arrangement described below is provided external to the end fitting the or each annular region access port may comprise an orifice or coupling at an exterior surface of the end fitting suitable to receive a connecting tube to couple to the manifold. Where the venting arrangement is at least partially incorporated into the end fitting, the or each annular region access port may comprise the form of connecting passageway or tube described above which extends to a pipe body annular region. According to certain embodiments of the present invention the manifold 800 may be attached to or incorporated into the end fitting itself. The further components of the venting arrangement may also be incorporated into the end fitting. The manifold 800 is illustrated coupled to first and second vent valves 806 and an annular region flushing valve 808, which may be a non-return valve. In certain embodiments there may only be a single vent valve 806 or there may be more than two. Each vent valve 806 serves to vent gas from the pipe body annular region in the manner described above in connection with FIGS. 3 to 7. The manifold 800 serves to bring each valve into fluid communication with the pipe body annular region. The manifold 800 is shown in cross section to reveal an arrangement of passageways 802 which interconnect each valve. It will be appreciated that the arrangement of passageways within the manifold may vary according to the respective numbers of vent valves 806 and annular region flushing valves 808 (in the event that more than one is provided). The manifold may be configured such that it may be opened to expose the passageways, or it may be a sealed unit. The passageways 802 are marked A, B, C, and D according to respective connections to vent valves 806, the annular region flushing valve 808 and the annular region access port 802, though clearly this arrangement is only exemplary. The annulus flushing valve 808 serves to periodically flush the annular region access port 804, which advantageously removes any debris blocking the port 804 or the manifold 800 itself. This prevents blocking and may therefore serve to prolong the life span of the riser 203 by ensuring pressure does not build up to a point where the outer sheath of the pipe body is breached by the annulus internal pressure. The annular region flushing valve 808 may also serve to fill the pipe body annulus with a fluid including a corrosion inhibitor. The annular region flushing valve 808 may also serve to flush the interior side of the vent valves 806. Furthermore, the annular region flushing valve 808 may be used to extract fluid samples from the pipe body annular region for testing (particularly in the case that the vent valves 806 exhaust gas only). It will be appreciated that the annular region flushing valve 808 is arranged with respect to the manifold 800 in an opposite direction to the vent valves 806. That is, whereas the vent valves serve to vent fluid from the annular region via the annular region access port 804 when the pressure within the manifold 800 exceeds the pressure on the other side of the vent valve 806 by a predetermined amount, the annular region flushing valve serves to admit fluid into the manifold 800 when the pressure outside of the manifold on the opposite side of the annular region flushing valve 808 exceeds the pressure within the manifold 800 by a further predetermined amount (which may be same amount or may differ). The respective valve types suitably comprise non-return valves acting in opposite directions.

Advantageously, because the embodiment of the present invention illustrated in FIG. 8 allows for the annular region access port 804 and/or the vent valves (and the manifold) to be flushed to prevent blocking, the present invention does not require independent access to the pipe body annulus for each vent valve. This may result in a more streamlined end fitting. The embodiment of the present invention illustrated in FIG. 8 may be retrofitted to existing end fittings, if it is configured in a form external to the end fitting itself) to prolong their life span, even for end fittings with only a single annular region access port which were hitherto at risk of blocking. Such retrospective fitting may comprise removing one or more existing vent valves and coupling the connecting passageway to the manifold 800. It will be appreciated that this may require that the manifold is configured with more than one connection to annular region access ports. Alternatively, the manifold may be wholly incorporated into the body of a new end fitting, with internal or external connections to each vent valve or annulus flushing valve (or one or more of the valves may also be incorporated into the body of the end fitting) and inwardly to one or more annular region access ports.

Furthermore, because in normal operation it may be expected that there will no longer be a need to replace a vent valve (given that it can be flushed from inside the manifold to prevent blocking) there is no risk of sea water entering the manifold during replacement of a vent valve at a sub-sea location.

The embodiment of the present invention shown in FIG. 8 also provides for dual redundancy for the vent valves while requiring only a single annular region access port. Each vent valve operates independently of the other. Preferably, each vent valve is able to accommodate the maximum anticipated flow of fluid from the pipe body annulus such that correct operation will continue in the event of total failure of one of the vent valves. Further redundancy may be provided by substituting a non-return annulus flushing valve with a valve that also serves to vent fluid from the annulus. It will be appreciated that this redundancy may be extended by coupling further vent valves to the same manifold. Redundancy can be increased further by providing multiple manifolds, each connected to a separate annular region access port within the end fitting or cross coupled to the or each same annular region access port.

The manifold 800 may suitably comprise a milled block of steel or corrosion resistant alloy, suitable for the environment and the pressure requirements of the service in which it will operate, in which passageways coupling to each valve 806, 808 and the annular region access port 804 intersect. The manifold may include a removable front plate for maintenance purposes (sealed with suitable sealing systems), which upon removal exposes the passageways 802. However, the present invention is not restricted to any particular form of manifold. Indeed in other embodiments there may be no separate component identifiable as a manifold in the event for instance that each valve 806, 808 directly accesses or branches off a single annular region access port 804 or a suitable connecting passageway.

FIG. 8 further illustrates optional sub-sea isolation valves 810. As each vent valve 806 may operate independently to accommodate fluid flow from the pipe body annular region, sub-sea isolation valves $810^1$ and $810^2$ may be provided between each vent valve 806 and the manifold 800, at least for embodiments of the invention where the manifold 800 is external to the end fitting. Optionally, the annular region flushing valve 808 may also be coupled to the manifold through an isolation valve 810, though this is not illustrated in FIG. 8. The manifold 800 itself may be coupled to the annular region access port 804 via an isolation valve $500^3$, though again this may not be required or appropriate where the manifold 800 or other portions of the venting arrangement forms part of the end fitting. FIG. 8 is shown partially exploded and partially in cross section, which exposes the internal passageways 802 within the manifold 800 and suitable forms of each valve 806, 808, though the present invention is not limited to the particular valves shown in FIG. 8. Each isolation valve 810 may be closed to isolate a valve, or the whole manifold, allowing its replacement in the event of damage or blocking that can't be alleviated through the injection of a flushing fluid through the annular region flushing valve 808. This allows for in service vent valve testing and replacement. Furthermore, actuation of the isolation valves 810 coupled to the vent valves 806 may allow the annular region flushing valve 808 to be used to pressurise the annulus up to the rating of the pipe body where this is required for maintenance or testing. This allows for in service annulus flushing.

Figure 9:
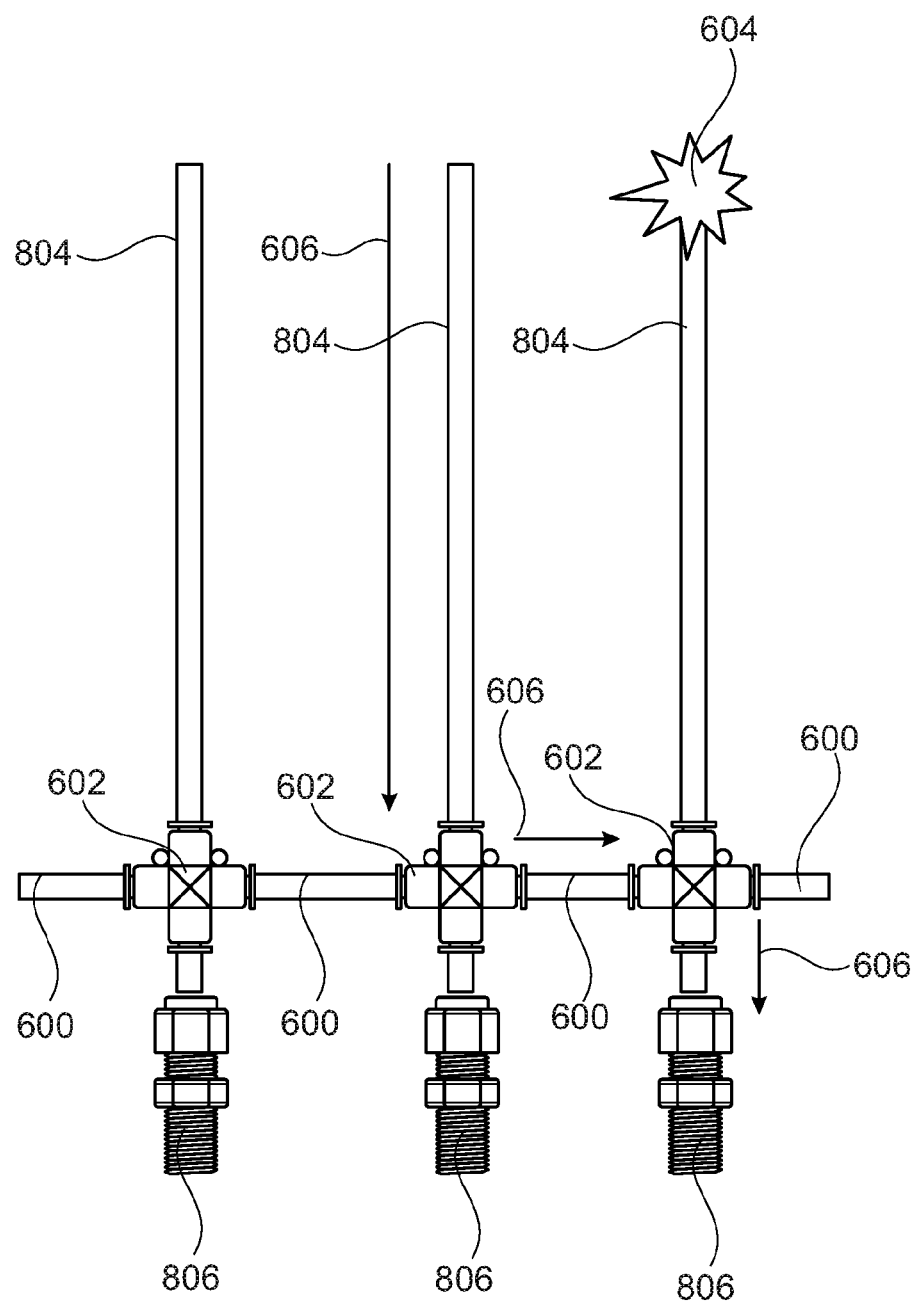
FIG. 9 illustrates a vent arrangement for a flexible pipe body according to another embodiment of the present invention.

Referring now to FIG. 9, in accordance with a further embodiment of the present invention multiple vent valves 806 (two or more, three being illustrated) may be cross coupled to annular region access ports 804 (two or more, three being illustrated) via separate cross coupled connecting tubes 600. The connecting tubes 600 comprise lateral flow tubes interconnected by four-way couplers 602. The arrangement is shown in an open ended fashion in FIG. 9 such that additional annular region access ports 804 and vent valves 806 may be provided, but it will be appreciated that at the edges of the system the four-way couplers 602 may be replaced by three-way couplers. Alternatively, in a scenario in which annular region access ports 804 are distributed about the periphery of an end fitting, the lateral flow tubes may be connected in a closed loop. More generally, the annular region access ports 804 and the vent valves 806 may be cross coupled in any desired fashion. In the event of a blockage 604 in a first annular region access port 804 or indeed any portion of a connecting tube extending to an annular region access port 804, the lateral flow tubes 600 allow a vent valve that would otherwise cease to operate to be connected to the pipe body annular region as indicated through arrows 606 through a parallel annular region access port 804. The arrangement of connecting tubes 600 may be referred to as a connecting harness. Alternative connection schemes will be readily apparent to the appropriately skilled person.

As for the embodiment of the invention shown in FIG. 8, the embodiment of FIG. 9 allows for enhanced redundancy in the event of a failure insofar as each vent valve may still be used in the event of a one or two connecting tubes or annular region access port blocking, so long as there remains at least vent valve in fluid communication with the pipe body annular region. This solution may be readily retrofitted to existing flexible pipe end fittings or incorporated into a modified end fitting, in which case the necessary couplings may be partially or fully incorporated into the body of the end fitting itself.

It will be appreciated that by extension the manifold of FIG. 8 may be cross coupled to multiple end fitting annular region access ports through a similar arrangement of connecting harness to that shown in FIG. 9. In such a situation multiple manifolds may be cross coupled to multiple access ports or a single manifold may have multiple inwards connections to annular region access ports. Similarly, the use of an annular region flushing valve may be incorporated into the connecting harness of FIG. 9, thereby providing the same benefits to the embodiment of FIG. 9: flushing to clear blocked connecting tubes, vent valves, access ports or manifolds. Also, the vent valves shown in FIG. 9 may be coupled via isolation valves as for FIG. 8 to allow each vent valve to be isolated and repaired or replaced.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flushing method comprising:
providing a flexible pipe comprising an end fitting and a first flexible pipe body coupled to the end fitting, wherein the end fitting comprises:
a body coupled to the first flexible pipe body, the body having a bore in fluid communication with a bore of the first flexible pipe body, and the body being further coupled to a second flexible pipe body, a further end fitting or flexible pipe terminal equipment;
an annular region access port formed within or connected to the body and in fluid communication with an annular region of the first flexible pipe body; and
a vent arrangement comprising:
a vent valve coupled to the annular region access port such that the vent valve can vent fluid from the pipe body annular region via the annular region access port; and
an annular region flushing valve coupled to the annular region access port and in fluid communication with the vent valve;
wherein the method further comprises injecting fluid into the vent arrangement through the annular region flushing valve to flush the vent valve and the annular region access port, and injecting fluid through the annular region flushing valve into the pipe body annular region via the annular region access port for flushing the pipe body annular region.

2. A method of manufacturing a flexible pipe, the method comprising:
coupling an end fitting comprising a body to a first flexible pipe body such that a bore of the body is in fluid communication with a bore of the first flexible pipe body;
coupling the body to a second flexible pipe body, a further end fitting or flexible pipe terminal equipment;
wherein the end fitting further comprises:
an annular region access port formed within or connected to the body such that it is in fluid communication with an annular region of the first flexible pipe body; and
a vent arrangement comprising:
a vent valve coupled to the annular region access port such that the vent valve can vent fluid from the pipe body annular region via the annular region access port, wherein the vent valve is arranged such that fluid from the pipe body annular region can flow through the vent valve to a location outside the end fitting; and
an annular region flushing valve coupled to the annular region access port and in fluid communication with the vent valve such that the annular region flushing valve can inject fluid into the vent arrangement for flushing the vent valve and the annular region access port, and such that the annular region flushing valve can inject fluid into the pipe body annular region via the annular region access port for flushing the pipe body annular region;
wherein the annular region flushing valve is a normally-closed check valve having an inlet and an outlet, wherein the normally-closed check valve is configured to block fluid from flowing into the annular region access port when fluid pressure at the inlet is less than a predetermined fluid pressure at the outlet and to open and allow fluid to flow into the annular region access port when the fluid pressure at the inlet exceeds the predetermined pressure at the outlet.

3. The method of claim 1, wherein the vent arrangement comprises at least two vent valves coupled together to be in fluid communication with one another and coupled to the annular region access port such that each vent valve may vent fluid from the pipe body annular region via the annular region access port.

4. The method of claim 1, wherein the vent valve is coupled to the annular region access port and at least one further annular region access port of the end fitting such that the vent valve may vent fluid from the pipe body annular region via any coupled annular region access port.

5. The method of claim 4, wherein the vent arrangement further comprises:
- at least two vent valves coupled together to be in fluid communication with one another and coupled to the annular region access port such that each vent valve may vent fluid from the pipe body annular region via the annular region access port; and
- a connecting harness arranged to cross couple the at least two vent valves to the annular region access port and the at least one further annular region access port.

6. The method of claim 1, wherein the vent arrangement further comprises a manifold interconnecting the vent valve and the annular region flushing valve.

7. The method of claim 1, wherein the vent arrangement further comprises at least one isolation valve coupled to the vent valve and arranged to selectively isolate the vent valve or the annular region flushing valve from fluid communication with the remainder of the vent arrangement.

8. The method of claim 1, wherein the vent arrangement is coupled to or at least partially incorporated into the body of the end fitting.

9. A flexible pipe comprising an end fitting and a first flexible pipe body coupled to the end fitting, wherein the end fitting comprises:
- a body coupled to the first flexible pipe body, the body having a bore in fluid communication with a bore of the first flexible pipe body, and the body being further coupled to a second flexible pipe body, a further end fitting or flexible pipe terminal equipment;
- an annular region access port formed within or connected to the body and in fluid communication with an annular region of the first flexible pipe body; and
- a vent arrangement comprising:
  - a vent valve coupled to the annular region access port such that the vent valve can vent fluid from the pipe body annular region via the annular region access port, wherein the vent valve is arranged such that fluid from the pipe body annular region can flow through the vent valve to a location outside the end fitting; and
  - an annular region flushing valve coupled to the annular region access port and in fluid communication with the vent valve such that the annular region flushing valve can inject fluid into the vent arrangement for flushing the vent valve and the annular region access port, and such that the annular region flushing valve can inject fluid into the pipe body annular region via the annular region access port for flushing the pipe body annular region;
  - wherein the annular region flushing valve is a normally-closed check valve having an inlet and an outlet, wherein the normally-closed check valve is configured to block fluid from flowing into the annular region access port when fluid pressure at the inlet is less than a predetermined fluid pressure at the outlet and to open and allow fluid to flow into the annular region access port when the fluid pressure at the inlet exceeds the predetermined pressure at the outlet.

* * * * *

UNITED STATES PATENT AND TRADEMARK OFFICE
CERTIFICATE OF CORRECTION

Page 1 of 1

PATENT NO. : 11,149,894 B2
APPLICATION NO. : 16/312157
DATED : October 19, 2021
INVENTOR(S) : Carney et al.

It is certified that error appears in the above-identified patent and that said Letters Patent is hereby corrected as shown below:

On the Title Page

Column 1, item (71), Applicant: GE Oil & Gas UK Ltd, Bristol (GB) should be -- Applicant: Baker Hughes Energy Technology UK Limited, Bristol (GB) --.

Signed and Sealed this
First Day of March, 2022

Drew Hirshfeld
*Performing the Functions and Duties of the
Under Secretary of Commerce for Intellectual Property and
Director of the United States Patent and Trademark Office*